(12) United States Patent
Saito et al.

(10) Patent No.: US 6,401,858 B1
(45) Date of Patent: Jun. 11, 2002

(54) CENTER TAKE-OFF TYPE HYDRAULIC POWER STEERING APPARATUS

(75) Inventors: Tatsuya Saito; Satoshi Hamano, both of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/670,312

(22) Filed: Sep. 26, 2000

(30) Foreign Application Priority Data

Nov. 25, 1999 (JP) .......................................... 11-333700

(51) Int. Cl.[7] .................................................. B62D 5/06
(52) U.S. Cl. ...................................... 180/428; 277/636
(58) Field of Search ................................ 180/428, 426, 180/427, 143, 433, 434, 439; 277/634, 636; 74/422, 498

(56) References Cited

U.S. PATENT DOCUMENTS

| | | | | |
|---|---|---|---|---|
| 3,951,045 A | * | 4/1976 | Frei et al. ................... | 180/435 |
| 4,373,599 A | * | 2/1983 | Walter et al. ................ | 180/428 |
| 4,428,450 A | * | 1/1984 | Stenstrom et al. ........... | 180/428 |
| 4,522,419 A | | 6/1985 | Yoshida et al. .............. | 280/96 |
| 4,676,335 A | * | 6/1987 | Adams ........................ | 180/428 |
| 4,865,149 A | * | 9/1989 | Rohrbach et al. ........... | 180/428 |

* cited by examiner

*Primary Examiner*—Daniel G. DePumpo
(74) *Attorney, Agent, or Firm*—Orum & Roth

(57) ABSTRACT

A center take-off type hydraulic power steering apparatus structured such that respective inner ends of a pair of right and left tie rods are provided so as to be positioned at a substantially center portion of a vehicle body. One end of a rack shaft commonly serving as a power piston rod passes through a power cylinder so as to protrude in a direction of a wheel house and a dust boot is put over between one end of the rack shaft and one end of the power cylinder housing, wherein a boot guard shutting a side opposing to the wheel house of the dust boot is mounted to one end of the rack shaft.

9 Claims, 3 Drawing Sheets

CENTER TAKE-OFF TYPE HYDRAULIC POWER STEERING APPARATUS

BACKGROUND OF THE INVENTION

1. Field of the Invention

The present invention relates to a center take-off type hydraulic power steering apparatus. More particularly to a center take-off type hydraulic power steering apparatus which intends to protect a dust boot covering a portion in which one end of a rack shaft, commonly serving as a power piston rod, passes through a power cylinder so as to protrude in a direction of a wheel house.

2. Description of Related Art

Conventionally, in most of the center take-off type hydraulic power steering apparatus, a design is made so that a range of a stroke of the rack shaft commonly serving as the power piston rod is received within a power cylinder housing. However, in accordance with the structure mentioned above, a difference is generated between right and left pressure receiving areas of the power piston within the power cylinder chamber and unbalance is generated between right and left power assist characteristics. In order to remove the unbalance so as to make the right and left power assist characteristics equal, it is unavoidable that a structure of a gear box portion becomes complex.

In order to avoid a complex structure of the gear box portion, there has been developed a structure such that one end of the rack shaft passes through the power cylinder so as to protrude in a direction of a wheel house. This makes the right and left pressure receiving areas of the power piston equal to each other, whereby the right and left power assist characteristics are made equal to each other.

In this structure, the size of the apparatus is increased when covering the portion in which one end of the rack shaft protrudes from the power cylinder by the housing. Hence the structure is made such that the dust boot is put over the protruding portion, the end portion of the dust boot is fixed to the end portion of the rack shaft and the end portion of the dust boot serves the same motion as that of the end portion of the rack shaft.

However, the end portion of the rack shaft moves within the wheel house so as to reciprocate when fixing the end portion of the dust boot to the end portion of the rack shaft. Therefore snow is attached and frozen on inner and outer surfaces of a wall of a wheel house chamber, the end portion of the rack shaft and the end portion of the dust boot are collided with the snow wall when a vehicle runs on a snow road in winter. This produces a risk that the end portion of the dust boot is damaged. Further, when the end portion of the dust boot is broken in this manner, the water enters into the gear box housing from the breaking portion, thereby causing an inferior operation and a reduction of durability of the power steering apparatus.

SUMMARY OF THE INVENTION

An object of the present invention is to provide a center take-off type hydraulic power steering apparatus which can solve the problems mentioned above contained in the conventional center take-off type hydraulic power steering apparatus. Also it is able to prevent a dust boot put over a portion in which one end of a rack shaft commonly serving as a power piston rod passes through a power cylinder so as to protrude in a direction of a wheel house from being broken by a snow wall attached and frozen on inner and outer surfaces of a wall of a wheel house chamber.

In accordance with the present invention, there is provided a center take-off type hydraulic power steering apparatus structured such that respective inner ends of a pair of right and left tie rods are provided so as to be positioned at a substantially center portion of a vehicle body. One end of a rack shaft commonly serving as a power piston rod passes through a power cylinder so as to protrude in a direction of a wheel house. A dust boot disposed between one end of the rack shaft and one end of the power cylinder housing, wherein a boot guard shutting a side opposing to the wheel house of the dust boot is integrally mounted to one end of the rack shaft.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENT

A description will be given below of an embodiment stated in the present application with reference to FIGS. 1 to 4.

Figure 1:
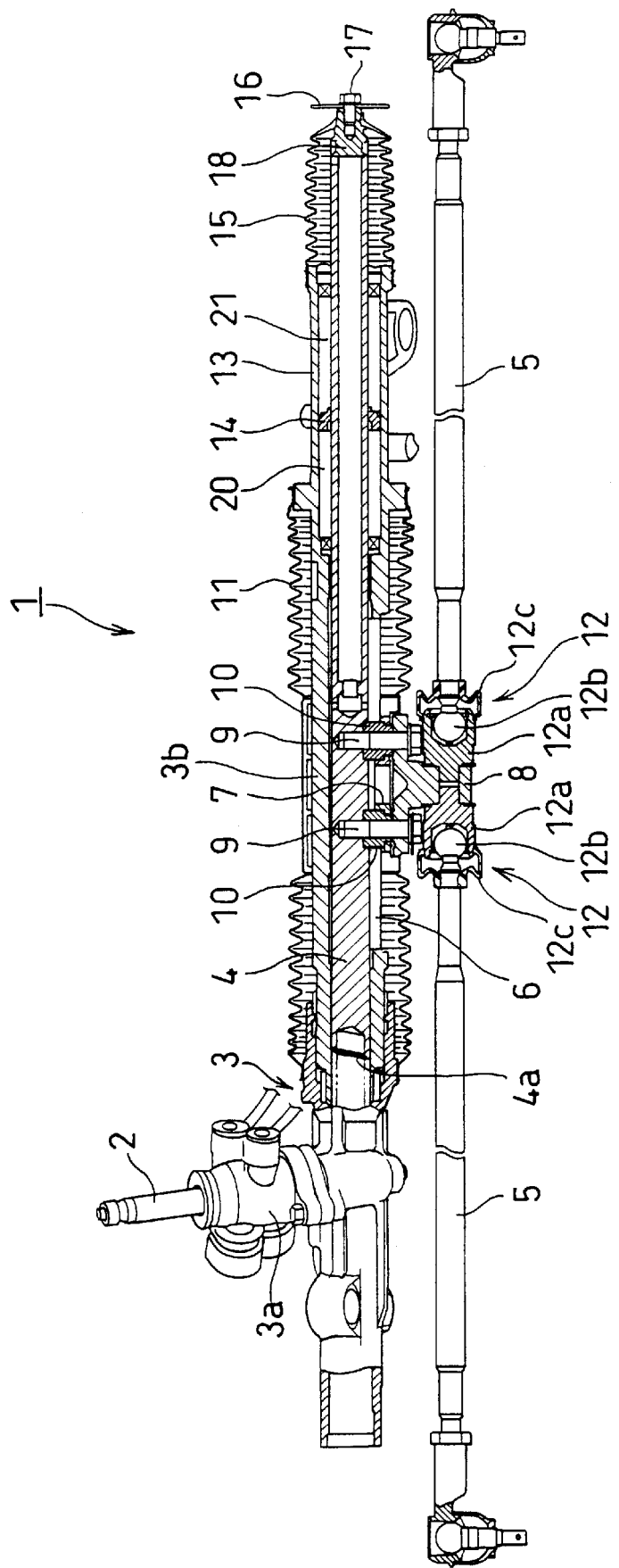
FIG. 1 is a front elevational cross sectional view of a center take-off type hydraulic power steering apparatus in accordance with an embodiment of the present invention, a part of which is shown by an outer surface view.

In FIG. 1, a center take-off type hydraulic power steering apparatus 1 in accordance with an embodiment is a rack and pinion type power steering apparatus. An input shaft 2 connected to a handle of a vehicle (not shown) is connected to an output shaft (not shown) via a torsion bar within a rotary valve receiving portion 3a of a gear box housing 3, and a rack shaft 4 having a rack 4a meshing with a pinion formed in the output shaft is received within a rack shaft receiving portion 3b of the gear box housing 3 in such a manner as to freely slide in a lateral direction in FIG. 1.

Further, a pair of right and left tie rods 5 and 5 are provided so that respective inner ends thereof are positioned near a center portion of the rack shaft receiving portion 3b of the gear box housing 3 (near a center portion of a vehicle body).

A notch groove 6 is formed along a predetermined length in a substantially center portion in a lengthwise direction of the rack shaft receiving portion 3b of the gear box housing 3, and the structure is made such that a guide shoe 7 can integrally move within the notch groove 6 in a lateral direction together with the rack shaft 4. Although a detailed illustration is omitted, the guide shoe 7 is a narrow plate body in which both end portions are formed in a semicircular shape and override between the respective inner ends of a pair of right and left tie rods 5 and 5, and a circular hole is punched out in the center portion. Accordingly, the portion is shown by a reverse printing in FIG. 1.

The guide shoe 7 guides the respective inner end portions of a pair of right and left tie rods 5 and 5 so as to integrally move in a lateral direction together with the rack shoe 4. Accordingly, the respective inner end portions of the tie rods 5 and 5 are swingably connected to a leg portion of a connection member 8 having a T-shaped cross section. Both vane portions of the connection member 8 and guide shoe 7 are connected to the rack shaft 4 via a collar 10 by a pair of right and left bolts 9 and 9. In accordance with the connection and joint structure among the respective inner end portions of the tie rods 5 and 5, the connection member 8, the guide shoe 7 and the rack shaft 4 mentioned above, these elements integrally move in a lateral direction.

A central flat portion of a dust boot 11 is gripped between both of the vane portions of the connection member 8 and the guide shoe 7 by being passed by the collar 10 and the bolts 9 and 9 therethrough. The collar 10 positions the rack shaft 4, the guide shoe 7, the connection member 8 and the dust boot 11 thereamong.

A structure of a portion in which the respective inner end portions of the tie rods 5 and 5 are swingably connected to the connection member 8 is made as follows.

A spherical bearing 12a of a ball joint 12 is engaged with each of both side surfaces of the leg portion of the connection member 8 having the T-shaped cross section in a laterally symmetrical manner. Spherical body portions 12b and 12b in the respective inner ends of the tie rods 5 and 5 are inserted to spherical recess portions (bearing portions) of the spherical bearings 12a and 12a so as not to be disengaged. Accordingly, the respective inner end portions of the tie rods 5 and 5 are swingably connected to the connection member 8. A cover 12b is put over a connection portion between the spherical recess portion of the spherical bearing 12a and the spherical body portion 12b so as to cover the connection portion.

Accordingly, when the rack of the rack shaft 4 is meshed with the pinion so as to move laterally, the guide shoe 7 and the tie rods 5 and 5 integrally move in a lateral direction in accordance with the lateral motion, whereby the right and left wheels are steered.

A portion close to a right end in FIG. 1 of the rack shaft receiving portion 3b of the gear box housing 3 is set as a power cylinder 13. Then, an end of the rack shaft 4 commonly serving as a power piston rod passes through the power cylinder 13 in a direction of a wheel house 22 (refer to FIG. 2) of a vehicle so as to protrude. Right and left pressure receiving areas of the piston 14 integrally provided in the rack shaft 4 are made equal to each other within the chamber of the power cylinder 13. An opposite side to the wheel house 22 with respect to a chamber wall 22a of the wheel house 22 corresponding to a boundary is set as an engine room 23.

As mentioned above, the respective end portions of the dust boot 15 are adhered to one end of the rack shaft 4 protruding from the power cylinder 13 and one end of the housing of the power cylinder 13 in the same side as this one end, and the portion in which one end of the rack shaft 4 passes through the power cylinder 13 so as to protrude is covered by the dust boot 15.

A structure of the portion in which one end portion (a right end portion in FIG. 1) of the dust boot 15 is adhered to one end of the rack shaft 4. This is actually made such that one end portion of the dust boot 15 is fitted to a protruding portion of a rack end plug 18 closing an opening in a right half hollow portion of the rack shaft 4 (refer to FIG. 2). The dust boot 15 prevents the water from entering into the gear box housing 3 and intends to keep safety of the body.

Figure 2:
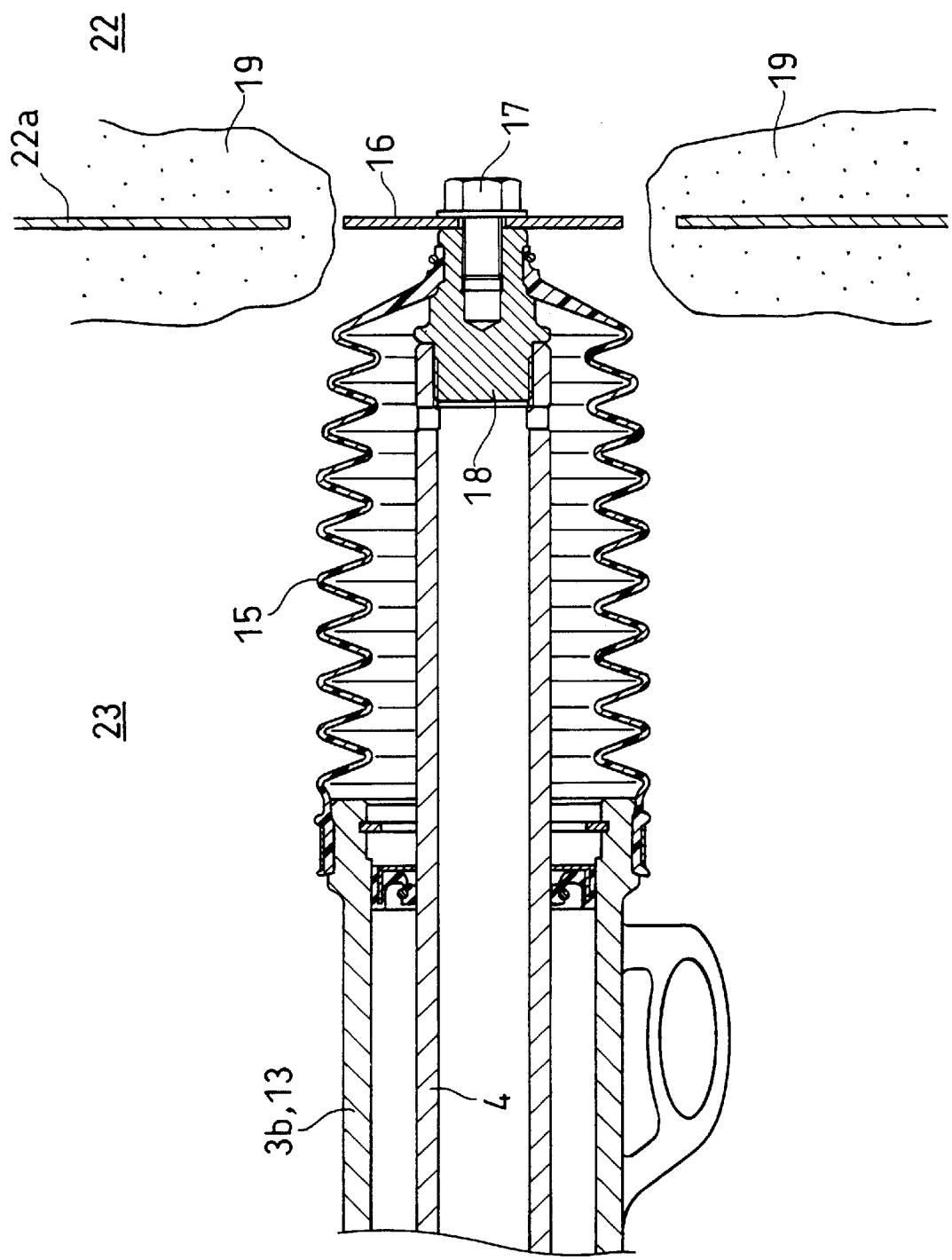
FIG. 2 is a partly cross sectional view of the center take-off type hydraulic power steering apparatus and shows a state that an end portion of a rack shaft protrudes into a wheel house.
Figure 3:
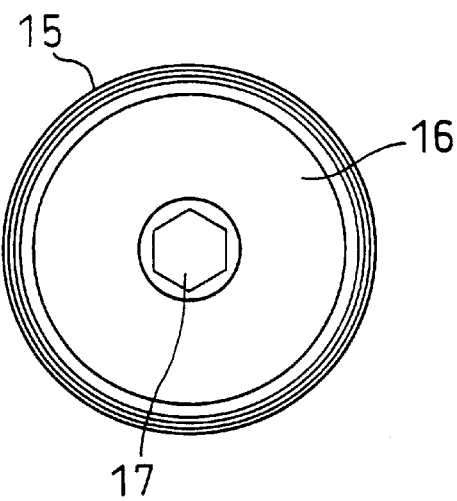
FIG. 3 is a partly right side elevational view of FIG. 2.
Figure 4:
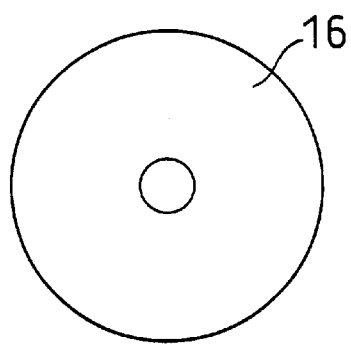
FIG. 4 is a front elevational view of a boot guard.

A boot guard 16 is integrally mounted to one end of the rack shaft 4 by being fastened to an end surface of a rack end plug 18 by means of a bolt 17. The boot guard 16 is, as shown in FIGS. 2 and 4, constituted by a metal disc, has an outer diameter which is substantially the same as a maximum diameter in the case that the dust boot 15 extends maximum, and shuts a side facing to the wheel house 22 of the dust boot 15.

Further, the boot guard 16 is collided with a snow wall 19 in response to the lateral motion of the end portion of the rack shaft 4 and the end portion of the dust boot 15. When the vehicle runs on the snow road in the winter and snow attaches and freezes on the inner and outer surfaces of the chamber wall 22a of the wheel house 22, the collision breaks the snow wall 19, thereby preventing the dust boot 15 from being interfered with the snow wall 19 and broken.

A pressurized oil generating a steering assist force is flowed in to and out from oil chambers 20 and 21 formed by being separated into right and left portions by the piston 14 within the chamber of the power cylinder 13 in accordance with a switching control of a rotary valve (not shown) received within the rotary valve receiving portion 3a of the gear box housing 3. Then, the structure is made such that a steering assist force in correspondence to a steering resistance of the wheel is transmitted to the wheel via the lateral motion of the piston 14, the rack shaft 4 and the tie rods 5 and 5.

Since the present embodiment is structured in the manner mentioned above, the following effects can be obtained.

In the center take-off type hydraulic power steering apparatus 1 is structured such that the respective inner ends of a pair of right and left tie rods 5 and 5 are provided so as to be positioned at a substantially center portion of a vehicle body, one end of the rack shaft 4 commonly serving as the power piston rod passes through the power cylinder 13 so as to protrude in a direction of the wheel house 22. The dust boot 15 is put over between one end of the rack shaft 4 and one end of the housing of the power cylinder 13 and the boot guard 16 shutting the side opposing to the wheel house 22 of the dust boot 15 is integrally mounted to one end of the rack shaft 4.

As a result, since the boot guard 16 shuts the side opposing to the wheel house 22 of the dust boot 15 from the snow wall 19 even when the vehicle runs on the snow road, snow attaches and freezes on the inner and outer surfaces of the chamber wall 22a of the wheel house 22. The end portion of the rack shaft 4 is collided with the snow wall 19 in response to the lateral motion. There is no risk that the end portion of the dust boot 15 is interfered with the snow wall 19 so as to be broken. Accordingly, it is possible to eliminate the risk that water enters into the gear box housing 3 so as to cause the inferior operation and the reduction of the durability of the power steering apparatus 1.

Further, since the boot guard 16 is constituted by the metal disc and is only fastened to the end surface of the rack end plug 18 closing the opening of the right half hollow portion in the rack shaft 4 by the bolt 17, the structure is significantly simple.

Figure 5:
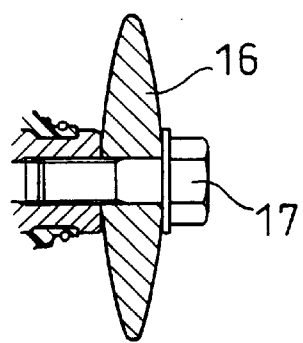
FIG. 5 is a cross sectional view showing a modified embodiment of the boot guard.

In the present embodiment, the structure is made such that the boot guard 16 is constituted by the metal disc independently provided from the rack end plug 18, however, the structure is not limited to this. For example, the structure may be made such as to be integrally formed with the rack end plug 18. Further, in order to improve the strength thereof, the structure is made such as to be formed in a block shape such as an oval cross sectional shape or the like (FIG. 5).

As heretofore explained, embodiments of the present invention have been described in detail with reference to the drawings. However, the specific configurations of the present invention are not limited to the embodiments, but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A center take-off hydraulic power steering apparatus comprises: respective inner ends of a pair of right and left tie rods arranged and constructed to be positioned at a substantially center portion of a vehicle body, one end of a rack shaft arranged and constructed as a power piston rod which passes through a power cylinder adapted to protrude in a direction of a wheel house and a dust boot disposed between one end of said rack shaft and one end of said power cylinder housing, wherein a boot guard for protecting a side opposing to said wheel house of said dust boot is mounted to one end of said rack shaft, and an outer diameter of said boot guard is substantially the same as the maximum diameter of said dust boot.

2. A center take-off hydraulic power steering apparatus as claimed in claim 1, wherein said boot guard is provided at an end surface of a rack end plug screwed to one end of said rack shaft.

3. A center take-off hydraulic power steering apparatus as claimed in claim 1, wherein said boot guard is integrally formed with a rack end plug screwed to one end of said rack shaft.

4. A center take-off hydraulic power steering apparatus as claimed in claim 1, wherein said boot guard comprises a metal disc.

5. A center take-off hydraulic power steering apparatus as claimed in claim 2, wherein said boot guard comprises a metal disc.

6. A center take-off hydraulic power steering apparatus claimed in claim 3, wherein said boot guard comprises a metal disc.

7. A center take-off hydraulic power steering apparatus comprises: respective inner ends of a pair of right and left tie rods arranged and constructed to be positioned at a substantially center portion of a vehicle body, one end of a rack shaft arranged and constructed as a power piston rod which passes through a power cylinder adapted to protrude in a direction of a wheel house and a dust boot disposed between one end of said rack shaft and one end of said power cylinder housing, a boot guard for protecting a side opposing to said wheel house of said dust boot is mounted to one end of said rack shaft, said boot guard comprises a block-shaped body made of a metal and has an oval cross sectional shape.

8. A center take-off hydraulic power steering apparatus comprises: respective inner ends of a pair of right and left tie rods arranged and constructed to be positioned at a substantially center portion of a vehicle body, one end of a rack shaft arranged and constructed as a power piston rod which passes through a power cylinder adapted to protrude in a direction of a wheel house and a dust boot disposed between one end of said rack shaft and one end of said power cylinder housing, a boot guard for protecting a side opposing to said wheel house of said dust boot is mounted to one end of said rack shaft, said boot guard is provided at an end surface of a rack end plug screwed to one end of said rack shaft, said boot guard comprises a block-shaped body made of a metal and has an oval cross sectional shape.

9. A center take-off hydraulic power steering apparatus comprises: respective inner ends of a pair of right and left tie rods arranged and constructed to be positioned at a substantially center portion of a vehicle body, one end of a rack shaft arranged and constructed as a power piston rod which passes through a power cylinder adapted to protrude in a direction of a wheel house and a dust boot disposed between one end of said rack shaft and one end of said power cylinder housing, a boot guard for protecting a side opposing to said wheel house of said dust boot is mounted to one end of said rack shaft, said boot guard is integrally formed with a rack end plug screwed to one end of said rack shaft, said boot guard comprises a block-shaped body made of a metal and has an oval cross sectional shape.

\* \* \* \* \*